Figure 1:
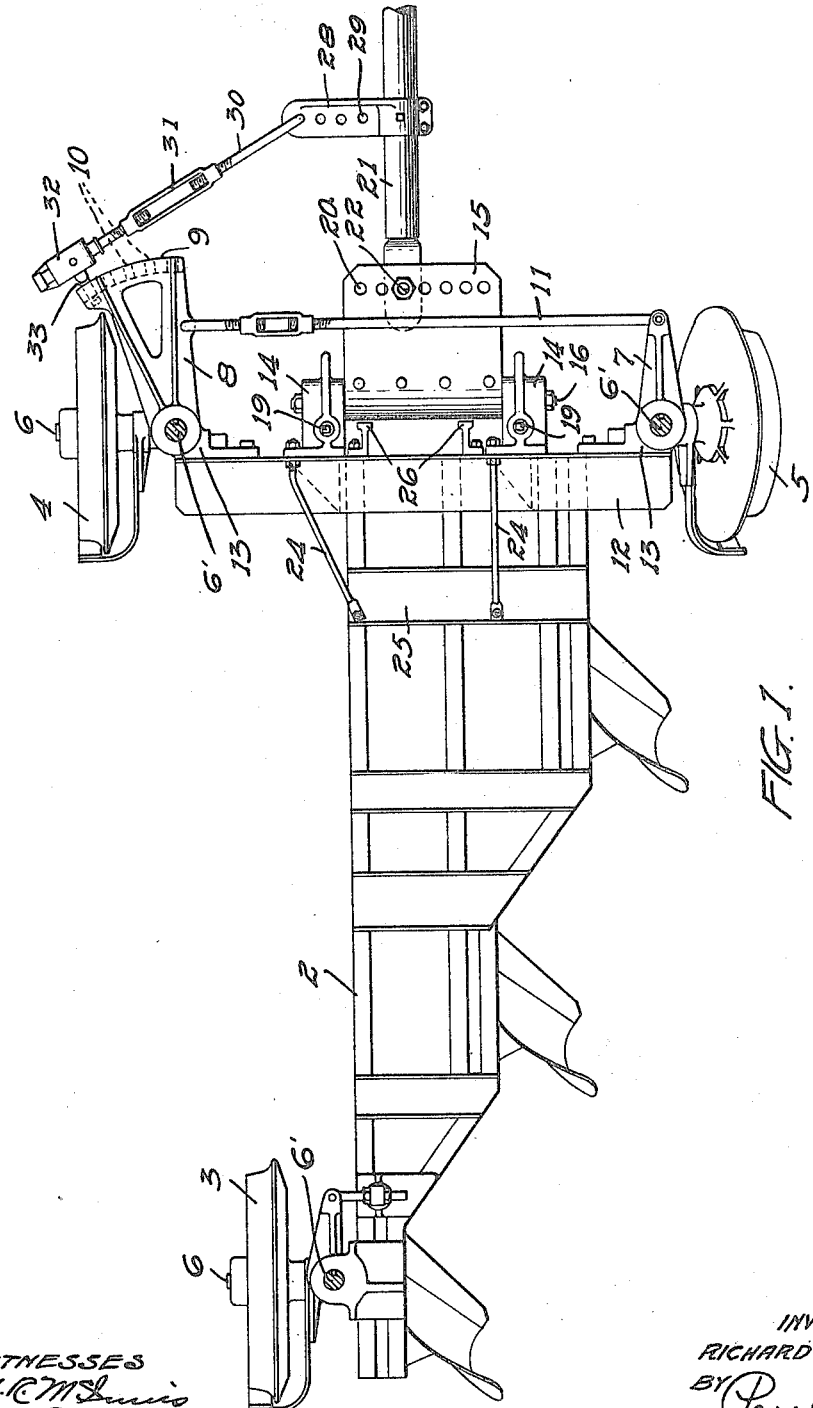

R. RUEMELIN.
PLOW HITCH.
APPLICATION FILED JUNE 26, 1913.
1,208,380.
Patented Dec. 12, 1916.
2 SHEETS—SHEET 2.
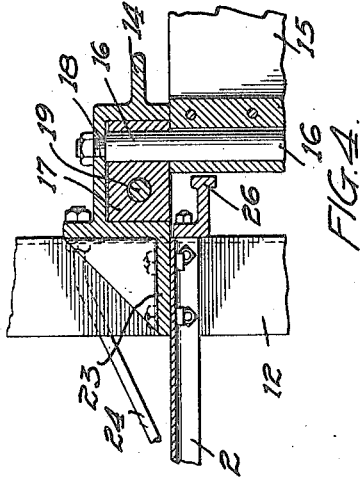
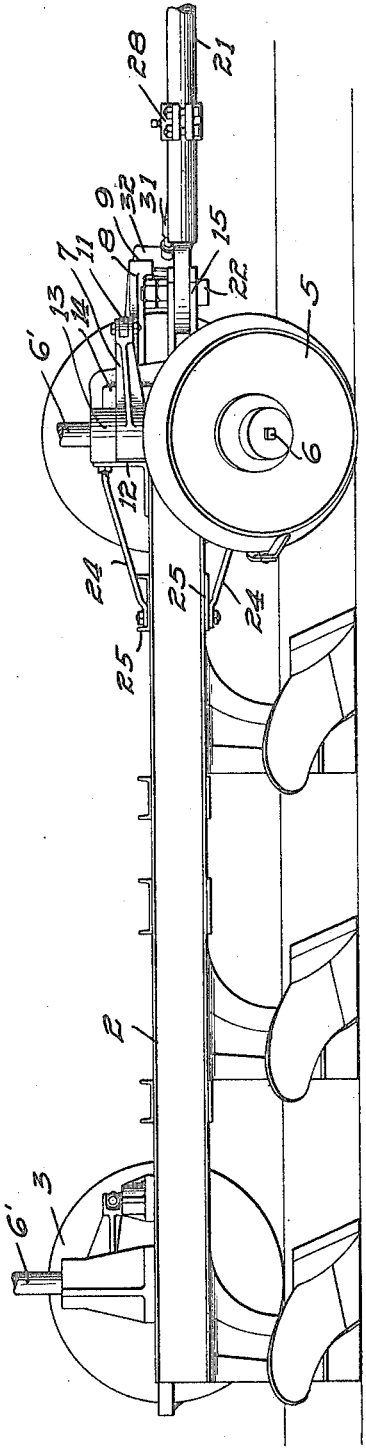
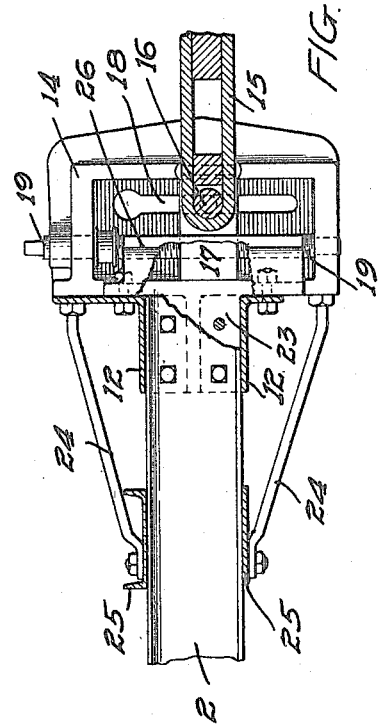
WITNESSES
INVENTOR
RICHARD RUEMELIN
BY
ATTORNEYS

UNITED STATES PATENT OFFICE.

RICHARD RUEMELIN, OF MINNEAPOLIS, MINNESOTA, ASSIGNOR TO MINNEAPOLIS STEEL & MACHINERY COMPANY, OF MINNEAPOLIS, MINNESOTA, A CORPORATION OF MINNESOTA.

PLOW-HITCH.

1,208,380.  Specification of Letters Patent.  Patented Dec. 12, 1916.

Application filed June 26, 1913. Serial No. 775,869.

*To all whom it may concern:*

Be it known that I, RICHARD RUEMELIN, a citizen of the United States, residing at Minneapolis, in the county of Hennepin and State of Minnesota, have invented certain Improvements in Plow-Hitches, of which the following is a specification.

This invention relates to improvements in devices designed for hitching a gang of plows behind a traction motor so that the same may be moved with a minimum amount of side draft thereby permitting the plows to be properly steered so as to produce a series of furrows in proper relation to the preceding furrows.

The invention consists generally in the constructions and combinations hereinafter described and particularly pointed out in the claims.

In the accompanying drawings forming part of this specification, Figure 1 is a plan view of a gang of plows and the frame upon which they are carried with my newly invented hitch applied thereto. Fig. 2 is a side elevation of same. Figs. 3 and 4 are details.

The plows to which this invention is applied are designed principally for plowing what is known as "mesquite" land in which there are many stumps that must be pulled or grubbed out by the plows, and it is frequently necessary in operating these plows to back them so as to free them from roots or stumps in which they may have become embedded and through which they cannot be pulled. It is required, therefore, that the hitch between the plow frame and the tractor shall be of such character as to cause the plows to be shoved backward whenever the engine is reversed and the tractor moved backward.

It is also desirable to provide adjusting means whereby a minimum amount of side draft occurs, and provide means for so controlling the steering wheels that in turning the plows may be caused to describe an arc of a larger circle than that described in the turning of the tractor, or may be caused to turn directly with the tractor and describe an arc of the same circle. Where the plows are caused to describe a larger arc than that described by the turning of the tractor, I designate this as delayed or "retarded" turning. Where the wheels of the plow frame follow the tractor, turning on an arc of the same circle, I designate this as "perfect" turning.

In the drawings, 2 represents a plow frame, of any suitable construction, having preferably the rear supporting wheel 3, and the forward wheels 4 and 5 which are mounted on the stub shafts 6 having the upright pins 6', and capable of turning while retaining a parallel relation to each other.

I make no claim to the construction of the plows or the supporting frame or the arrangement of the wheels upon which said frame is mounted. The upright 6 for the furrow wheel 5 is preferably provided with a crank arm 7 and the corresponding upright for the wheel 4 is provided with the crank arm 8, the forward end 9 of which is preferably in the form of a sector of a circle whose center is at the axis of the upright 6'. The face 9 of the arm 8 is provided with a series of pin holes 10 for the purpose hereinafter specified. The arms 7 and 8 are connected by a suitable rod 11. This rod, through the crank arms and the uprights 6' causes the wheels 4 and 5 to turn together and to retain a parallel relation. To the forward cross bar 12 of the plow frame, to the opposite ends of which the brackets 13 carrying the bearings for the uprights 6' are secured, I prefer to connect two forwardly projecting brackets 14, between which is arranged the broad flat plate forming a clevis 15. A horizontal pin or pintle 16 is mounted in the brackets 14 and passes through the rear of the clevis 15, forming a hinge upon which said clevis may rock. The ends of the pin 16 pass through blocks 17 and also through vertical slots 18 in the brackets 14. Adjusting screws 19 pass through the blocks 17 and by means of these screws the blocks may be raised and lowered and with them the hinge pin 16 and the rear end of the clevis 15. The forward end of the clevis 15 is provided with a series of holes 20, to any one of which the draw bar 21 may be connected by a pivot pin 22.

The brackets 14 are rigidly secured to the front or face of the cross bar 12, preferably by means of the angle iron brackets 23, and for the purpose of adding to the rigidity of the connection between the brackets to which the clevis 15 is hinged and the plow frame, I preferably provide the brace rods 24 connected to the upper and lower portions of said brackets and extending back and being bolted to the top and bottom of a second cross bar 25 upon said plow frame.

To relieve the strain upon the pivot pin 16 when the tractor is quickly or suddenly backed, as is often necessary to release the plows when they become caught or stuck in roots or stumps and cannot be pulled through them, I prefer to provide the buffers 26, which are in the form preferably of rigid angle iron brackets, bolted on to the front of the cross bar 12, with their forwardly extending ends in close proximity to the rear edge of the clevis 15. By this means when the tractor is backed and power is applied to force back the plows the rear end of the clevis abuts against the said buffers and the stress upon the pivot pin is relieved. The draw bar 21 may be of any preferred construction.

A suitable distance in front of the clevis 15 I prefer to secure upon the draw bar a laterally projecting arm 28, provided with a series of holes 29. This arm projects toward the land or stubble side of the machine. This arm is preferably clamped upon the draw-bar and is capable of being adjusted longitudinally toward or from the front end of the plow frame.

I also provide a suitable connecting rod that has one end connected to the arm 28, through one of the holes 29 of said arm. This connecting rod preferably consists of two sections, 30, having threaded ends and united by a turn-buckle 31. The end of the outer section is provided with a sleeve 32 in which is pivotally supported a pin 33. This pin is adapted to engage any one of the holes 10 in the face 9 of the crank arm 8. The connecting rod 30 may be lengthened or shortened by adjusting the turn-buckle 31, and further adjustment may be provided by means of the holes in the arm 28 and in the face of the crank arm 8.

Operation: The parts of the hitch may be readily adjusted to secure the desired "perfect" or "retarded" movement of the steering wheels of the plow frame in relation to the movement of the tractor. When it is desired to secure what I have designated as the "perfect" turning of the plows and the tractor, the connecting rod 30 is adjusted so that the distance between the hole 29, in the arm 28, and the pin 33, securing the opposite end of the connecting rod 30 to the face 9 of the arm 8, is equal to the distance on a straight line between the upright 6 and the axis of the pivot pin 22. With the parts in this relation the plow frame will turn with and describe the same circle as the tractor securing what I have designated as "perfect" turning. When it is desired to secure a "retarded" turning, the parts are adjusted so that the connecting rod 30 is shorter than the distance on a direct line between the axis of the upright 6 and the axis of the draw-bar pin 22. This can be accomplished by adjusting the outer end of the connecting rod 30 in reference to the face 9 of the crank arm 8. A further adjustment may be secured by connecting the rod 30 to one of the other holes in the arm 28. Another adjustment may be secured by moving the arm 28 lengthwise of the draw-bar, and a still further adjustment is obtained by shifting the draw-bar to the right or left and connecting its pivot pins to one or another of the holes 20 in the clevis 15. When the parts are adjusted so as to secure this delayed turning the plows will continue in the general direction of the line of travel after the motor has begun to turn and the plows will describe a circle of much larger radius than that described by the outer tractor wheels and consequently the plows will be carried forward a greater distance than they would be if they turned directly with the tractor.

It is also found that in many instances it is necessary to adjust the hitch or connection between the plows and the tractor so that the plows may tend to pull upward or to dig deeper into the soil. I regulate the position of the plows by means of the adjusting screws 19 which permits the rear end of the clevis 15 to be raised or lowered as desired. By adjusting the clevis to a lower position an upward pull on the points of the plows is obtained and by adjusting it to a higher position these points tend to dig more deeply into the ground. It will also be seen that in whatever position the clevis may be, whenever the tractor is backed for the purpose of forcing backward the plows, the rear edge of the clevis will come into contact with the faces of the buffers 26 and thereby strain upon the pivot pin 16 will be relieved.

I do not limit myself to the details of construction herein shown and described, as the same may be varied in many particulars without departing from my invention.

I claim as my invention:

1. The combination, with a plow frame of the character described, the steering crank arms thereof, and means connecting the same, of a vertically adjustable clevis connected to the forward end of said plow frame, a laterally adjustable draw-bar connected to said clevis, an adjustable arm upon said draw-bar, a connecting rod, means adjustably connecting one end of said rod to said arm, and means adjustably connecting the other end of said rod to one of said steering crank arms, substantially as described.

2. The combination, with a plow frame of the character described, and the steering crank arms thereof, of a clevis connected to the forward end of said plow frame, means for vertically adjusting said clevis, a draw-bar connected to said clevis, means for laterally adjusting the connection between said draw-bar and said clevis, an arm mounted upon said draw-bar, means for adjusting said arm lengthwise of said draw-bar, a connecting rod, means adjustably connecting one end of said rod to said arm and means adjustably connecting the other end of said rod to one of said steering crank arms, substantially as described.

3. The combination, with a plow frame, of the character described, the steering arms thereof, and means connecting the same, of a clevis connected by a horizontal pivot to the forward end of said plow frame, a laterally adjustable draw-bar connected to said clevis, an arm upon said draw-bar, a connecting rod, means connecting one end of said rod to said arm, and means adjustably connecting the other end of said rod to one of said steering crank arms, substantially as described.

In witness whereof, I have hereunto set my hand this 16th day of June 1913.

RICHARD RUEMELIN.

Witnesses:
EDWARD A. PAUL,
GENEVIEVE E. SORENSEN.

Copies of this patent may be obtained for five cents each, by addressing the "Commissioner of Patents, Washington, D. C."